(12) United States Patent
Benhammou

(10) Patent No.: US 9,886,850 B2
(45) Date of Patent: Feb. 6, 2018

(54) MONITORING INTERSECTION DELAYS IN A TRANSPORTATION NETWORK

(71) Applicant: Acyclica, Inc., Frisco, CO (US)

(72) Inventor: Daniel Benhammou, Frisco, CO (US)

(73) Assignee: ACYCLICA INC., Denver, CO (US)

( * ) Notice: Subject to any disclaimer, the term of this patent is extended or adjusted under 35 U.S.C. 154(b) by 0 days.

(21) Appl. No.: 15/611,457

(22) Filed: Jun. 1, 2017

(65) Prior Publication Data

US 2017/0270784 A1 Sep. 21, 2017

Related U.S. Application Data

(63) Continuation of application No. 15/162,310, filed on May 23, 2016, which is a continuation-in-part of application No. 14/215,472, filed on Mar. 17, 2014, now Pat. No. 9,349,286.

(60) Provisional application No. 61/790,595, filed on Mar. 15, 2013.

(51) Int. Cl.
| | |
|---|---|
| *H04L 12/801* | (2013.01) |
| *G08G 1/01* | (2006.01) |
| *H04L 29/08* | (2006.01) |
| *H04B 17/318* | (2015.01) |
| *H04L 12/26* | (2006.01) |
| *H04W 84/12* | (2009.01) |

(52) U.S. Cl.
CPC .......... *G08G 1/012* (2013.01); *G08G 1/0112* (2013.01); *G08G 1/0116* (2013.01); *G08G 1/0133* (2013.01); *G08G 1/0141* (2013.01); *H04B 17/318* (2015.01); *H04L 43/0876* (2013.01); *H04L 67/12* (2013.01); *H04W 84/12* (2013.01)

(58) Field of Classification Search
CPC ....... H04L 12/12; H04L 1/008; H04L 43/062; H04L 43/12; H04L 47/24; H04L 61/2007; G05D 1/021; G05D 1/0285; G05D 1/0287; G08G 1/0116; G08G 1/0133; G08G 1/20; G08G 1/0104; G08G 1/0141; G08G 1/0145; G07B 15/063
USPC .... 701/1, 117–119; 340/901, 902, 910, 917, 340/988, 991, 995.13; 455/456.1
See application file for complete search history.

(56) References Cited

U.S. PATENT DOCUMENTS

| | | | | |
|---|---|---|---|---|
| 7,908,080 | B2 * | 3/2011 | Rowley | G08G 1/096811 701/423 |
| 8,918,278 | B2 * | 12/2014 | Feldman | G08G 1/0104 701/118 |
| 9,449,507 | B2 * | 9/2016 | Basir | G08G 1/0104 |
| 2010/0254282 | A1 * | 10/2010 | Chan | H04W 24/08 370/253 |

(Continued)

*Primary Examiner* — Dalena Tran
(74) *Attorney, Agent, or Firm* — Marsh Fischmann & Breyfogle LLP; Kent A. Fischmann; Jeremy J. Neilson

(57) ABSTRACT

A traffic monitoring system (400) includes a network of geographically distributed sensors (401-403). The sensors (401-403) provide raw or preprocessed data to a processing system (405) based on received long range wireless signals (e.g., 2.4 GHz, 5.8 GHz, or 5.9 GHz spectrum). The processing system (405) can then implement any of various algorithms to calculate traffic parameters taking into account the range of communication between the source and the sensor. The inputs to these algorithms include a first contacts, last contacts, maximum range, minimum range, median of contacts, average of contacts, maximum strength, and combinations thereof.

36 Claims, 9 Drawing Sheets

| Algorithms Inputs | Points |
|---|---|
| First Contacts | 1, 4 |
| Last Contacts | 3, 6 |
| Max Range | 1, 6 |
| Min Range | 3, 4 |
| Median | 1 – 6 |
| Average | 1 – 6 |
| Max Strength | 1 – 6 |
| Combined | 1 – 6 |

(56) References Cited

U.S. PATENT DOCUMENTS

2012/0083996 A1* 4/2012 Tas ...................... G08G 1/0116
                                                                             701/119

\* cited by examiner

MONITORING INTERSECTION DELAYS IN A TRANSPORTATION NETWORK

CROSS-REFERENCE TO RELATED APPLICATION

This application is a continuation of U.S. patent application Ser. No. 15/162,310 entitled "TRAFFIC ANALYSIS SYSTEM USING WIRELESS NETWORKING DEVICES," filed May 23, 2016, which is a continuation-in-part of U.S. patent application Ser. No. 14/215,472 entitled "TRAFFIC ANALYSIS SYSTEM USING WIRELESS NETWORKING DEVICES," filed on Mar. 17, 2014, which claims priority to U.S. Provisional Patent Application No. 61/790,595 entitled, "TRAFFIC ANALYSIS SYSTEM USING WIRELESS NETWORKING DEVICES," filed Mar. 15, 2013. The contents of these applications is incorporated herein by reference as if set forth in full.

FIELD OF THE INVENTION

The present invention relates to monitoring wireless devices associated with pedestrians, vehicles on roadways, public transportation vehicles and/or passengers, etc. The wireless devices may be monitored to provide traffic information, monitor wait times or foot traffic, fleet management, and other applications. With respect to vehicles, the invention allows for monitoring traffic on a roadway network (e.g., including controlled access highways, surface roads and/or other roadways) to obtain traffic information about conditions on the roadway network such as travel times, intersection delays, traffic speeds and/or other information or derivatives thereof. In particular, the present invention relates to monitoring wireless network communications using a network of geographically distributed sensors to determine such traffic information.

BACKGROUND OF THE INVENTION

Wireless devices can be monitored for a variety of applications involving vehicles, pedestrians, public transportation and other contexts. The case of traffic monitoring is illustrative. Conventionally, traffic information was obtained by using human observers in vehicles or aircraft, or by using cameras distributed at various locations across a monitored portion of the roadway network. The resulting traffic information could then be reported to motorists on the roadway network (or soon to be on the roadway network) via radio, television, telephone or other devices or could be reported to government officials or others. This traffic information could then be used by the motorists, for example, to select routes, to determine approximate travel times, to allocate resources, to manage traffic (e.g., by setting or changing traffic light cycle times/durations or otherwise for planning purposes. While useful, this information was not always timely, complete, or readily available to motorists and other interested parties.

More recently, automated or semi-automated systems have been proposed for monitoring traffic conditions. These systems detect vehicles on roadways and employ a processor to determine traffic information based on the detected vehicles. Such systems include systems that detect vehicles based on Bluetooth™ technology. Bluetooth™ technology is typically used to replace wireline connections between master-slave device pairings of a wireless personal area network, e.g., between a mobile phone and a wireless headset or between a mobile phone and a Bluetooth™ enabled car radio. Because of the personal area network nature of these devices, the associated radio transceivers generally have a short communications range, often on the order of meters or tens of meters. Moreover, because these devices are intended for use in a dedicated master-slave network context, communication between devices may be sporadic (e.g., on an as-needed basis) and generally do not include, for example, probe requests searching for LAN or WAN access points and are not generally associated with received signal strength indication (RSSI) values.

SUMMARY OF THE INVENTION

It has been recognized that these attributes of Bluetooth™ technology have advantages and disadvantages with respect to use in traffic monitoring and other monitoring systems. A principal advantage of such systems is that they are relatively easy to implement. In this regard, sensors for detecting Bluetooth™ communications can be distributed across the roadway network. Because of the short range of typical of Bluetooth™ devices, a Bluetooth™ device in a vehicle moving perhaps 10-20 meters per second may be observed instantaneously, or over a short time window (associated with a small range of device locations), by a particular sensor. Accordingly, reasonably accurate traffic information can be easily obtained by correlating information for the same Bluetooth™ source from different sensors. On the other hand, the quantity and quality of information available for traffic analysis in such systems is limited due to the sporadic nature of communications, the limited number of devices and the limited types of communications.

The present invention relates to the use of longer range wireless signals—for example, signals related to operation of wireless LAN or WAN data communications networks—alone or in combination with short range wireless signals for traffic monitoring. The long range wireless signals generally have a range of greater than 100 meters, for example, on the order of hundreds or thousands of meters, whereas the short range signals generally have a range of less than 100 meters, for example, on the order of meters or tens of meters. The signals preferably include packets of data using protocols of the 2.4 GHz, 5.8 GHz, and 5.9 GHz spectrum. The invention—which encompasses a system, component of the systems and associated functionality—involves establishing a sensor network of geographically distributed sensors for detecting wireless communications associated with vehicles on a monitored portion of a roadway network. The wireless communications may be associated with any of various types of source devices including data network enabled mobile phones, tablets, laptop computers or other data devices, vehicle integrated hotspots, other mobile hotspots, dedicated short-range communication (DSRC) devices (e.g., associated with vehicle systems such as adaptive cruise control systems, emergency warning systems, forward collision warning systems, intersection collision avoidance systems, etc.) or other sources.

Due to the long range of signals of such source devices, in many cases, a given sensor may remain in communication with a given source for a substantial length of time associated with a substantial range of travel of the source and vehicle. In this regard, the sensor may receive a series or stream of data packets from each of multiple sources as well as a variety of types of signals in various network formats (data, telephone, etc.). The types of signals may include probe signals (e.g., signals provided by a device to seek and identify an available network platform for communication), responses to polling from the network, data communications between devices and a local hotspot, wLAN, wWan or other signals. In a preferred implementation, these signals may be filtered to distinguish signals associated with vehicles on the monitored portion of the roadway network from other signals, e.g., associated with stationary or pedestrian sources. For example, filtering packets to only include probe requests may substantially lessen the burden to the system. Alternatively, signals may be filtered by identifying changes in signal strength, based on a list of MAC addresses from one or more "upstream" sensors, or another indication of motion or relevance.

A variety of algorithms may then be implemented, alone or in combination, to yield desired traffic information. These algorithms may account for the significant range of the signal sources, and the corresponding range of travel of the sources while in signal contact with a sensor, in various ways. For example, these algorithms (as described in detail below) may utilize signal strength, rate of change of signal strength, point of first contact, point of last contact, minimum or maximum range of contacts over two or more sensors, and other parameters to gauge position, speed, acceleration, intersection dwell or latency, or other information of interest. The resulting traffic information can then be reported to clients.

BRIEF DESCRIPTION OF THE DRAWINGS

For a complete understanding of the present invention, and further advantages thereof, reference is now made to the following detailed description, taken in conjunction with the drawings, in which.

DESCRIPTION OF THE INVENTION

The present invention is directed to a system and associated functionality for monitoring wireless devices that may be used in a variety of applications involving monitoring pedestrians, vehicles, or other items. In the following description, the invention is set forth with respect to the illustrative context of a traffic monitoring system that may be used in various traffic monitoring contexts for various purposes. For example, the traffic monitoring system may be used by government planners to monitor traffic flow, for example, in considering how to deploy resources or operate traffic signals. Additionally or alternatively, the system may be used to monitor real time traffic conditions so as to provide information to motorists. It will be understood that the invention is not limited to this application.

Moreover, the invention may be used to monitor a specific point in a roadway network, such as an intersection of roadways (e.g., to measure one or more parameters associated with a travel delay in relation to a vehicle traversing the intersection) or may be more broadly distributed, e.g., to monitor critical arteries of a regional transportation grid. In this regard, the sensors of the system may be substantially permanently installed and/or may include mobile, temporary installations that can be deployed and redeployed as necessary.

The following description illustrates one implementation of a traffic monitoring system in accordance with present invention. This description is provided in the context of monitoring a small portion of a roadway network that includes surface streets meeting at an intersection as well as a portion of highway. It should be appreciated that this example is provided to illustrate various attributes of the present invention, but that the invention is not limited to this context or implementation.

Figure 1:
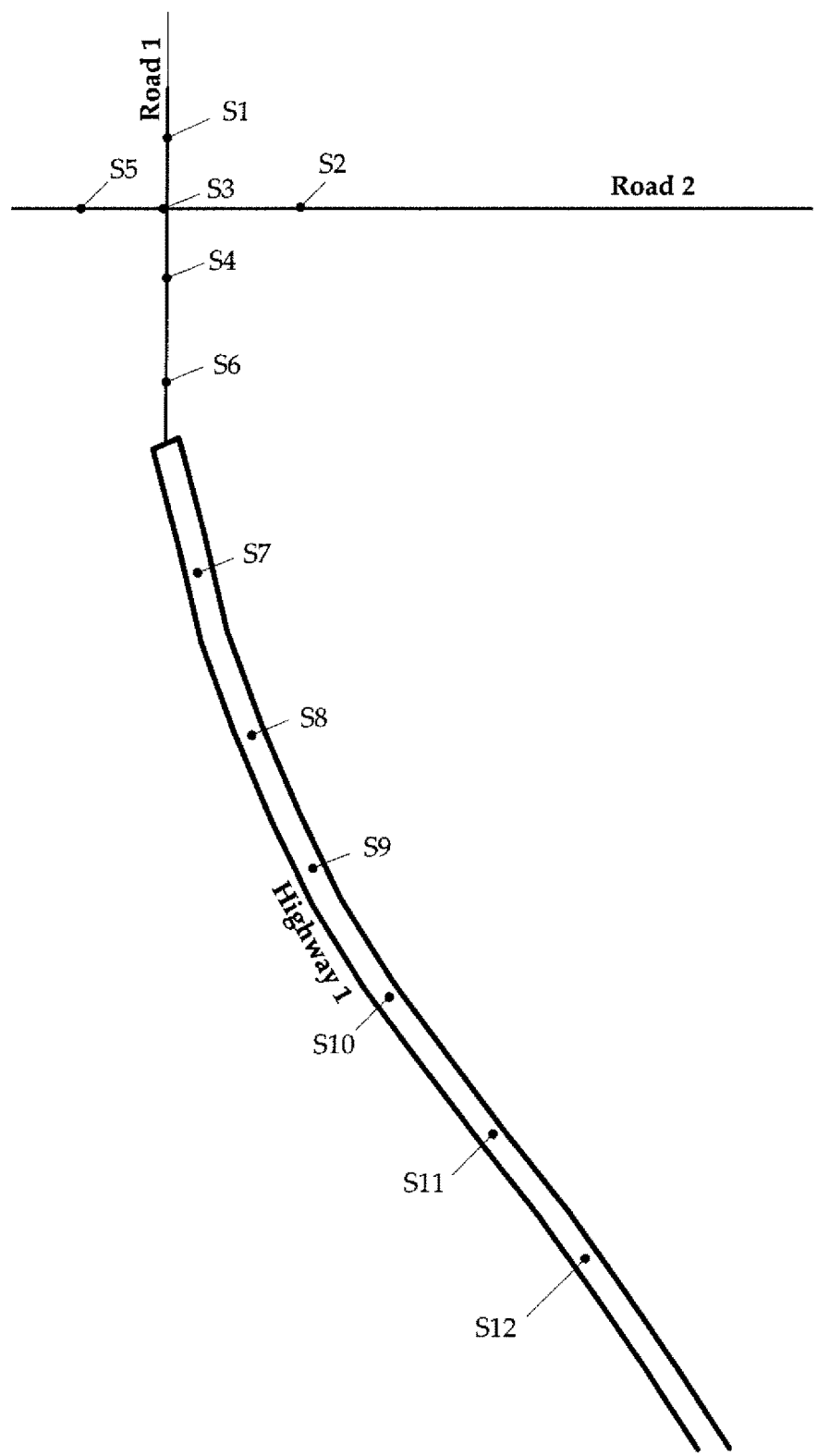
FIG. 1 is a schematic diagram illustrating an embodiment of a geographically distributed sensor network associated with a roadway network in accordance with the present invention.

The illustrative traffic monitoring system of the present invention involves the use of geographically distributed sensors to monitor at least a portion of a roadway network. FIG. 1 illustrates a number of sensors S1-S12 disposed along a portion of a roadway network that includes surface road 1, surface road 2 and highway 1. In particular, sensors S1-S5 may be used to monitor the intersection of surface road 1 and surface road 2, whereas sensors S6-S12 may be used to monitor traffic flow along highway 1. In other implementations, described in greater detail below, a signal sensor may be used to monitor a surface road intersection (e.g., to measure a travel delay based at least in part on signal strength information).

The sensors S1-S12 monitor communications associated with wireless networking devices in or of vehicles traveling along the roadway network. As noted above, such devices may include mobile phones, mobile data devices, DSRC devices or others. The sensors S1-S12 thus generally include antenna (e.g., one or more antennae per sensor) for receiving RF signals and associated logic for processing the signals to extract, for example, device identification information (such as a MAC address) and signal strength information (such as an RSSI).

Depending on the specific implementation, raw signal information may be transmitted to a remote processing system or some processing may be conducted at the sensor site. Accordingly, the sensors S1-S12 may include a data network interface for reporting information to a remote processing system, for example, that may be a cloud-based network of processors and memory devices. In this regard, the sensors may report to the remote processing system via a wireless and/or wireline network. Moreover, the processors S1-S12 may include logic for correlating data packets from a given device corresponding to a single transit event and logic for executing algorithms for processing such data sets as described below. It will be appreciated that the monitored communications will generally be provided in the form of a stream of packets, where each packet may include a header having device identification information and other overhead information, as well as payload data.

Such a stream of packets can be processed to collect data sets for use in traffic analysis. For example, a processor can analyze packets, on an individual packet basis, to extract various fields of data from the header and/or payload. This data may first be analyzed to identify the type of communication so as to identify communications of interest. This may involve identifying communications of the desired bandwidth and protocol (e.g., data network communications of the 2.4 GHz and/or 5.8 GHz spectrum) and of the desired message type. For example, if only probe messages are to be analyzed, all other message types of the desired bandwidth and protocol may be analyzed. Alternatively, all message types, or another subset thereof, of the desired bandwidth and protocol may be analyzed.

Data corresponding to one or more sets of communications from a particular source for a particular transit event may then be collected. For example, header information or other information may be analyzed to identify a device that originated the communication. A time stamp and data identifying the receiving sensor may then be stored in each case indexed to the source device. This process is then repeated for multiple data packets from multiple sources. Analysis of the data with respect to a given device, a given sensor, and a selected time window can then yield a data set corresponding to a transit event where a given source device passes across the receiving range of a given sensor. The ends of the receiving range may be determined by the technical limits of the sensor, by selected RSSI thresholds, or other standards.

Permanent sensor installations may be integrated into or otherwise associated with traffic signal posts, traffic signs, utility poles adjacent to roadways, or dedicated structures provided to support the traffic monitoring system. Temporary sensor installations may be mounted on vehicles or otherwise provided in units that can be deployed as needed adjacent to a roadway network. As discussed above, the devices monitored in accordance with the present invention generally will have a signal transmission range of greater than 100 meters, for example, on the order of hundreds or thousands of meters. Accordingly, the sensors need not be disposed immediately adjacent to a roadway, though more information may be obtained if they are located close to roadways of interest.

In FIG. 1, S1-S5 may be used to monitor the intersection between surface road 1 and surface road 2. Various sensor configurations may be utilized to monitor an intersection including, for example, a single sensor disposed near to the intersection, discussed in greater detail below. In the illustrated example, sensor S3 is disposed at the intersection whereas sensors S1, S2, S4, and S5 are disposed at roadway branches that feed into the intersection. The illustrated configuration may allow for better analysis of delays associated with the intersection, including differential delay depending on the route traveled across the intersection. For example, the delay associated with vehicles traveling from sensor S2 to S4 may be different than the delay associated with someone traveling from sensor S1 to S4. Moreover, the information from the sensors S1-S5 may be analyzed to determine components of delay associated with waiting for a traffic light to change versus delay associated with flow rates along road 1 or road 2. The positioning of the various sensors may be determined, with due regard for expected signal ranges, to enhance measurement of the noted parameters.

Sensors S6-S12 may be used to monitor traffic flow along highway 1. Again, the sensors S6-S12 provide information based on signals monitored by devices of vehicles traveling on highway 1. The signals from such devices can be correlated as between the different sensors and used to provide traffic information. For example, information from a sensor pairing may be used to provide transit time information for traffic between those sensors. Such sensor pairings may involve adjacent sensors (e.g., S6, S7) or non-adjacent sensor pairings (e.g., S6, S12). Multiple pairings, or larger sets of sensors, may be used to process data from the same device. For example, information from a single device may be used to compute transit time information from S6 to S7, from S6 to S8, and from S7 to S11. In addition, transit time information is not limited to a sensor pairing but may involve any number of sensors. Thus, for example, information for a given device from each of sensors S6-S12 (e.g., such as signal strength associated with a corresponding signal of the given device) may be used to compute average speed, to plot a speed as function of highway position or to compute various other kinds of derivative information such as accelerating traffic, decelerating traffic, rate of vehicles entering the highway and rate of vehicles exiting the highway, etc.

Figure 2:
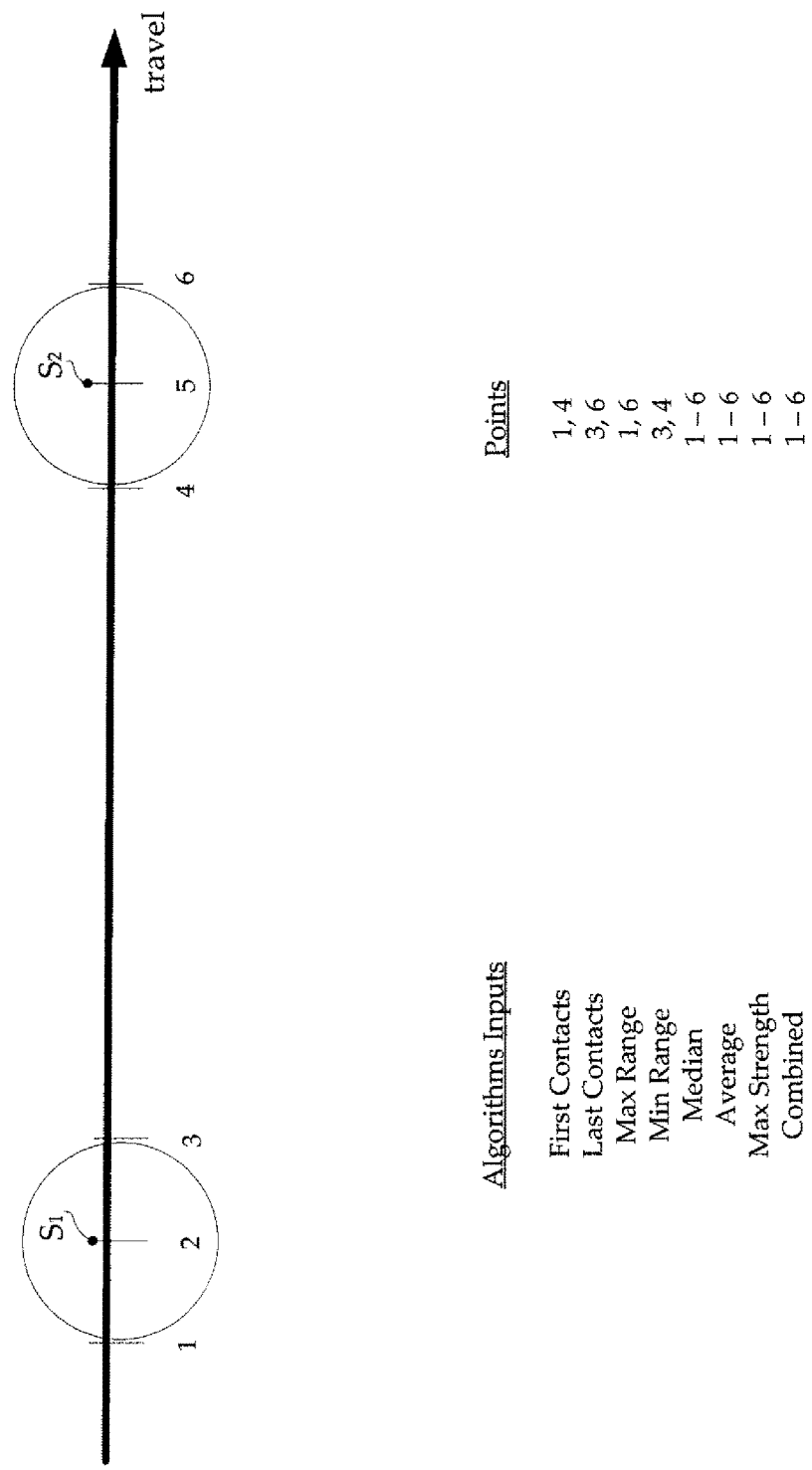
FIG. 2 illustrates an embodiment of various algorithm inputs that may be used to calculate travel parameters in accordance with the present invention.

Because the monitored devices have a significant signal transmission range a given sensor may receive signals from a device throughout a range of travel of that device. An example is illustrated in FIG. 2 where the circles depict transmission ranges of a device which is sequentially disposed adjacent to sensor S1 and then sensor S2. In this case, sensor S1 may first receive signals from the device when the device is disposed approximately at point 1 and may receive its last signals from the device when the device is approximately at point 3. Similarly, sensor S2 may receive its first signals from the device when the device is at point 4 and receive its last signals from the device when the device is at point 6.

One parameter that the traffic system may wish to determine is the transit time of the associated vehicle from the location of sensor 1 to the location of sensor 2, where the locations (e.g., geocodes) of sensor S1 and sensor S2 may be known (e.g., based on GPS—based determinations). For example, this transit time may be used to determine an average velocity of the vehicle across the section roadway between sensor S1 and sensor S2. The same calculations may be performed continually or monitored to obtain up-to-date information about traffic speeds and changes in traffic speeds. For example, at a given time, a current average speed for that roadway may be computed based on an average of calculated average speeds for all vehicles, or a subset of those vehicles, traveling along that roadway during a given time window, such as the most recent five minute time interval. It will be appreciated that various statistical methods may be used in computing such an average, such as excluding outliers and accounting for correlations between speed and types of devices monitored. For example, if devices in actual use yield a faster or slower average speed than speeds calculated based on passive polling communications, this may be accounted for in determining a composite (or differentiated) of average traffic speed. In this regard, signal strength information, such as RSSI (a defined signal strength metric of the IEEE 802.11 standard) is often available via the wireless network. Such values can be monitored over time or over a sensor transit event to obtain appropriate inputs for these algorithms. Further, signal strength information may be identified for each of a plurality of received signals in order to determine one or more parameters associated with the transit time of the device in relation to the sensor (e.g., a latency or travel time delay in relation to a point of interest in the traffic network, such as an intersection, etc.).

FIG. 2 illustrates a variety of different algorithm inputs that may be used, alone or in combination, to account for travel of a vehicle while a device remains in communication a given sensor. In this regard, a first contacts algorithm may compute transit time from S1 to S2 based on the difference in time between the first contact of the device with S1 and the first contact of the device with S2, corresponding to points 1 and 4 in the figure. A last contacts algorithm may use the time difference of the last contact of the device with S1 and the last of contact of the device with S2, corresponding to points 3 and 6. A maximum range algorithm may use the first contact with S1 and the last contact with S2 corresponding to points 1 and 6. A minimum range algorithm may use the last contact with S1 and the first contact with S2 corresponding to points 3 and 4. A median algorithm may use data across the full range to determine a median point of contact with S1 and a median point of contact with S2. All of the contact points with one of the sensors may be used to determine an average contact point between that device and that sensor. As a further alternative, a point of maximum strength of the received signal, generally corresponding to the closest proximity between the device and the sensor, may be used in determining transit time. Rate of change of signal strength may provide an indication of speed. In other embodiments, the rate of change of signal strength may provide an indication of latency or delay with respect to a location of interest associated with the sensor, such as an intersection.

It will be appreciated that different ones of these inputs may be utilized for different purposes or the inputs may be combined. For example, the first contacts, last contacts, max range, and min range information may be used to determine a speed profile across the section of road from point 1 to point 6. Moreover, it may be determined empirically that a particular set of inputs, such as max strength values, median values, etc., provide the most accurate information for a given analysis. As a still further alternative, it may be determined that calculating a transit time based on various sets of algorithm inputs, and then averaging the resulting transit times yields the best overall measure of transit time. Moreover, multiple sets of algorithm inputs may be used for validation purposes. For example, regardless of the set of algorithm inputs that is normally used for transit time calculations, a particular set of data may be excluded if, for example, the min range (or max range, or other value) exceeds a given threshold or deviates from that of other vehicles by more than a certain amount. For example, such information may indicate that a particular vehicle pulled-over or was delayed in a manner that is not representative of traffic conditions.

Figure 3:
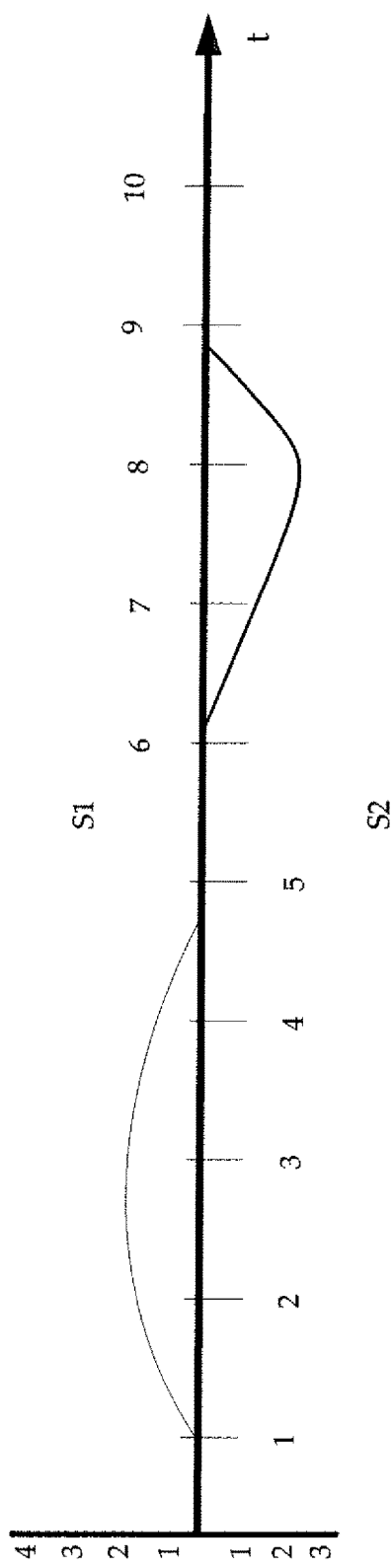
FIG. 3 illustrates an embodiment of data that may be utilized by various algorithms for calculating travel parameters in accordance with the present invention.

These algorithms may be further understood by reference to FIG. 3. FIG. 3 depicts signals from a device detected at sensors S1 and S2 over a period of time associated with travel along a roadway. In particular, the horizontal axis depicts travel time in arbitrary units whereas the vertical axis depicts signal strength again in arbitrary units. The signal strength for sensor 1 is plotted above the horizontal axis whereas the signal strength for sensor 2 is plotted below the horizontal axis. Although this is not always the case, the illustrated example depicts a situation where signals are continually received as the device travels past sensor S1 and sensor S2.

In the illustrated example, a first contacts algorithm may use points 1 and 6. A last contacts algorithm may use points 4.5 and 8.5. A maximum range algorithm could use points 1 and 8.5. A minimum range algorithm could use points 4.5 and 6. A median algorithm could use approximately 2.5 for S1 and approximately 7.5 for S2. A maximum signal strength algorithm may use approximately 2.5 for S1 and approximately for 8 for S2. It will appreciated that any of these algorithms may utilize a set of data corresponding to a transit event corresponding to travel of the device and associated vehicle across the section of roadway monitored by sensors S1 and S2. More specifically, there is first subset of data for a sensor corresponding to the transit event and a second subset of data corresponding to sensor S2 for that event. An individual sensor may process its own subset of data, for example, to calculate information such as first contact, last contact, median value, average value or point of maximum signal strength. Alternatively, these values may be calculated remotely. The transit time information is generally determined at a processing system having access to data from both S1 and S2, for example, at a location remote from both S1 and S2. In a preferred implementation, this is performed by a cloud-based processing system.

In any of these algorithms, locations (such as geocodes) can be associated with various points (e.g., points of interest in the traffic network, including an intersection). In a simple case, velocity information can then be calculated as the difference in position between two or more points divided by the difference in time associated with passing those points. Such information, or derivatives thereof, can be aggregated for a particular device or multiple devices to compile velocity profile information (which may be indicative of a travel delay with respect to a particular location, such as an intersection). In some cases, calculated values may be scaled or corrected in relation to direct observations to account for confounding factors such as variations in sensor strength, sensor interference, and the like. It will be appreciated that more complex analysis in the time or frequency domains can be utilized.

Figure 4:
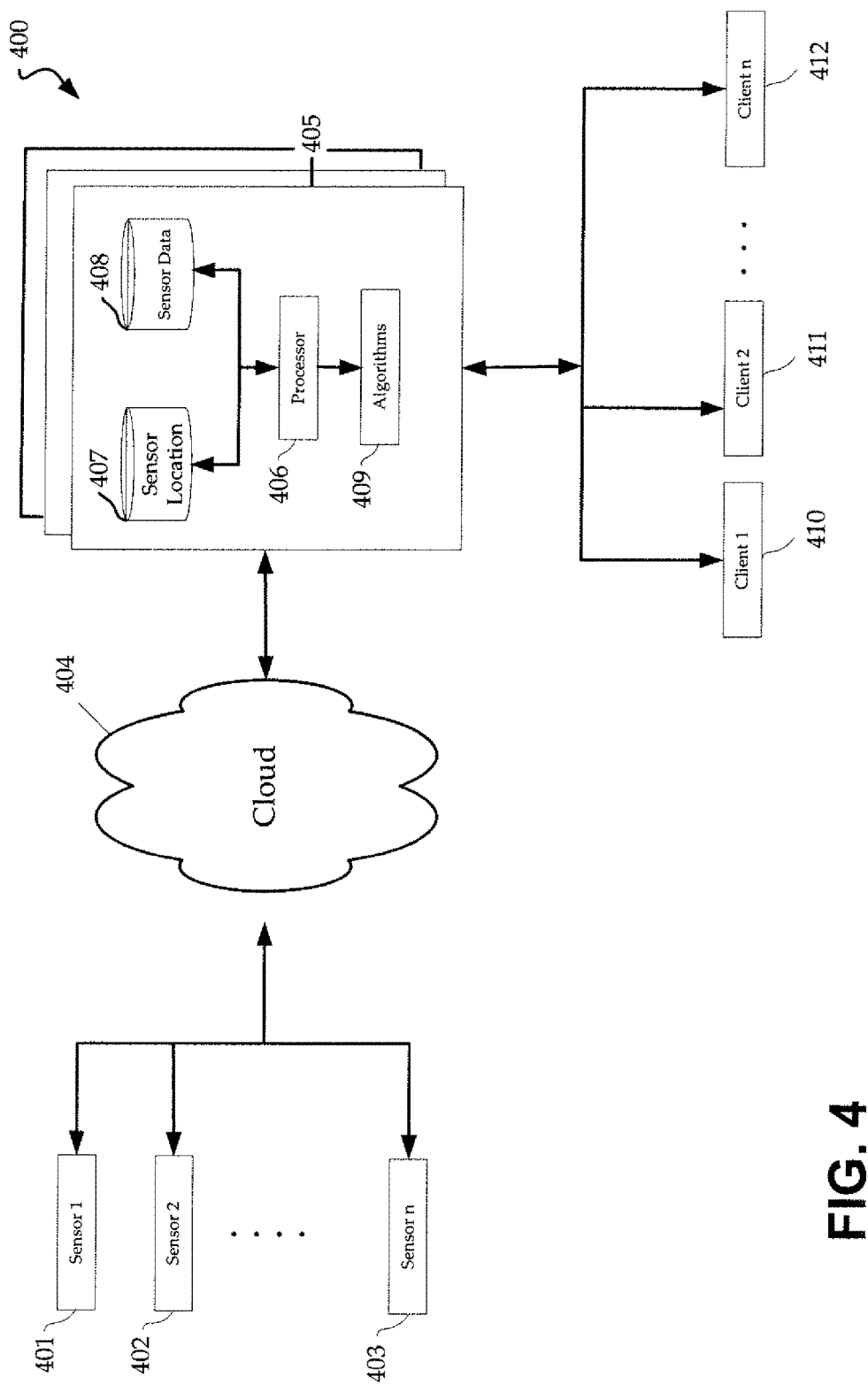
FIG. 4 is a schematic diagram illustrating an embodiment of a traffic monitoring system in accordance with the present invention.

FIG. 4 illustrates such a system 400. In the illustrated system 400, signal information obtained by a network of geographically distributed sensors 401-403. The sensors 401-403 then provide raw or preprocessed data to a processing system 405. The processing system 405 may be embodied as a single processing machine or may be distributed across multiple machines. In the illustrated implementation, the processing system 405 is implemented as multiple processing platforms in a cloud architecture. The sensors 401-403 may be connected to the processing platforms via a wireless and/or wireline communications network. The illustrated processing system 405 includes a processor 406 that can access data including sensor location information 407 and raw or processed sensor signal data 408 obtained from the sensors 401-403. In addition, the processor 406 can access one or more algorithms 409, as discussed above, to compute desired traffic information. The processing system 405 can output resulting information to one or more clients for 410-412. For example, these clients may include traffic monitoring applications running on devices of motorists, running on terminals of government planners, or running on any other desired platform.

Figure 5:
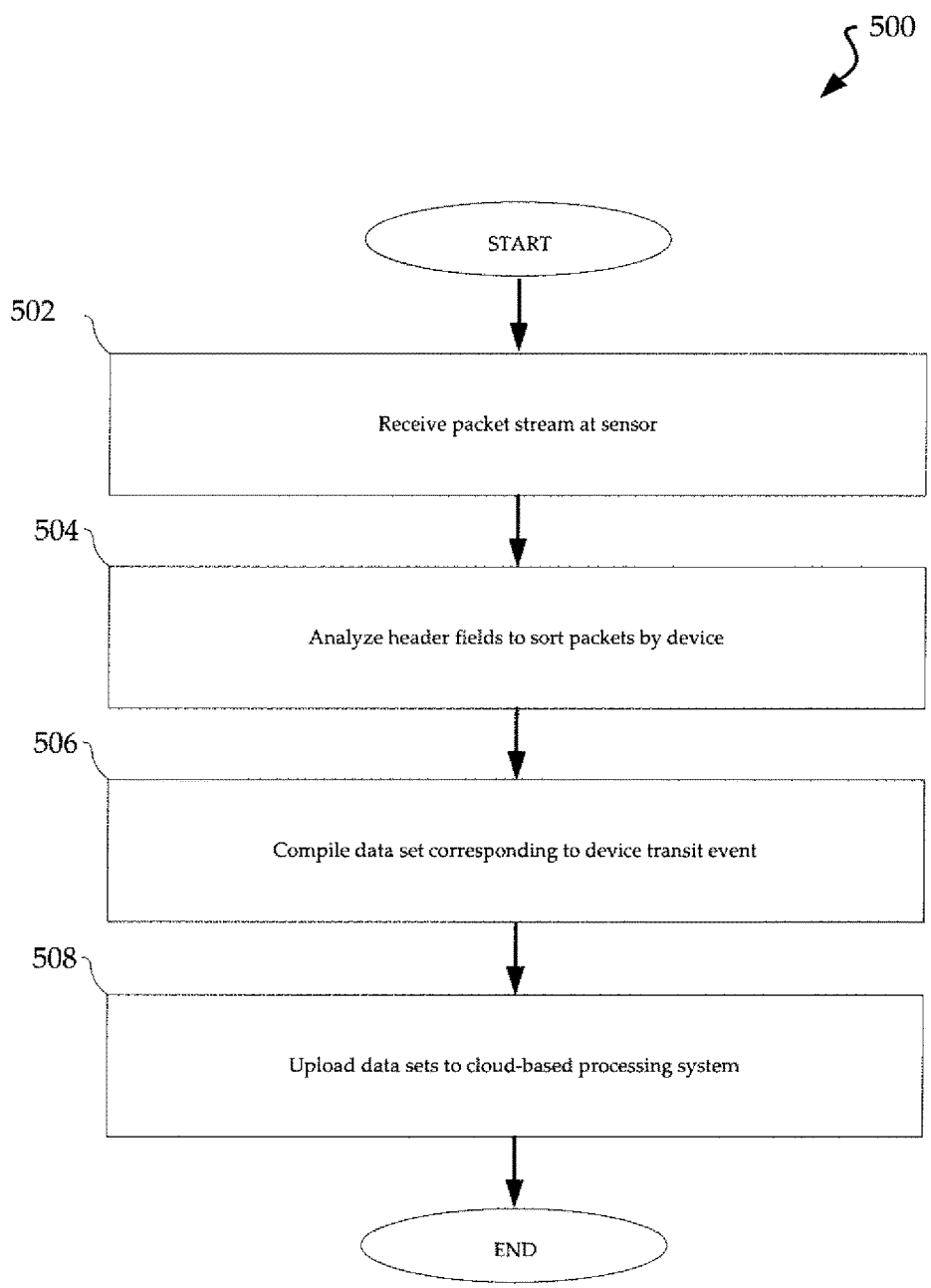
FIGS. 5-6 are flow charts illustrating an embodiment of processes implemented by components of the system of FIG. 4.

FIG. 5 is flowchart illustrating a process 500 that may be implemented by a sensor system in accordance with the present invention. The process is initiated by receiving (502) a packet stream at the sensor. The packet stream may include a series of data packets from each of multiple devices within range of the sensor for a given time window. As noted above, sensors may forward raw signal information to a remote platform or conduct some preprocessing. FIG. 5 includes optional steps associated with preprocessing at the sensor system. In particular, in the illustrated process, header fields of individual packets are analyzed (504) to sort packets by device. As noted above, the header fields may include device identification information such as a MAC address for the device. This information can be used to filter from the packet stream a set of packets corresponding to a given transit event for a given device. Data can then be compiled (506) corresponding to a device transit event. This may include a set of raw data or values such as a first contact point, a last contact, a median contact point, an average contact point, a maximum signal strength point, or the like. A resulting data set can then be uploaded (508) to a cloud-based processing system.

Figure 6:
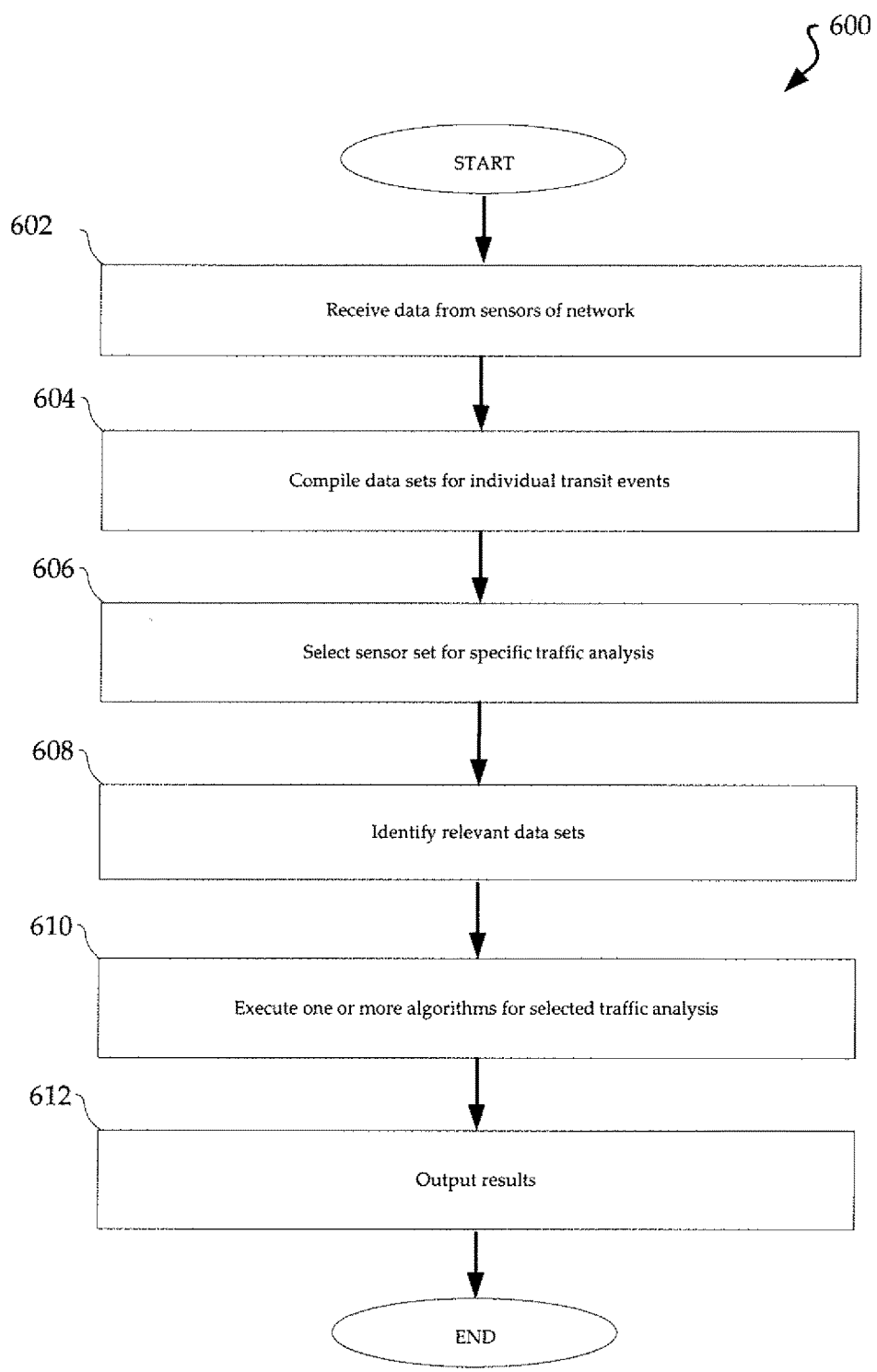

FIG. 6 is flowchart illustrating a process 600 that may be implemented by a cloud-based processing system in accordance with the present invention. The processing system receives (602) data from sensors of the network. As noted above, individual sensors may forward raw data or perform some preprocessing of the data. It is not necessary that all sensors are the same in this regard. Accordingly, in some cases the processing system may receive raw data and in other cases it may receive processed data. The processing system complies (604) data sets for individual transit events. In the case of raw data from a sensor, this may involve filtering and processing of data from that sensor. The processing system can also correlate data from different sensors for the same device corresponding to a particular transit event. For example, a given device may pass multiple sensors within a given time window indicating travel across a route of interest. In some cases, for example, associated with monitoring of an intersection, signals may be detected for the same source during a common time window, by different sensors associated with different roadways. In such cases, relative signal strength, signal strength profile over time, or other parameters may be used to determine the travel path so that appropriate data from corresponding sensor sets can be employed in the algorithm.

To obtain traffic information, the processing system, or an operator thereof, may select (606) a sensor set for a specific traffic analysis. For example, the processing system may be programmed to continually monitor traffic speed across a section or roadway bounded by two sensors. Alternatively, a user may query the processing system to obtain current travel time information for a specified route extending across multiple roadway sections and associated sensors. According to another embodiment, a user may query the processing system to obtain current travel time delay (latency or dwell) associated with a specified intersection of the traffic network. Based on the traffic analysis specified, the processing system is operative to identify (608) relevant data sets. Thus, in the case of an analysis to determine travel time for a specified route, the processing system may identify the relevant sensor systems and retrieve data sets from those sensor systems for a given device. The same information may be retrieved for multiple devices, for example, to obtain average travel time information. The processing system then executes (610) one or more algorithms as discussed above for a selected traffic analysis. The results can then be output (612) to one or more clients. The results may be provided in response to a query, automatically, or in response to a client reaching a location of interest on the roadway or crossing some other geofence.

According to another embodiment, one or more sensors may be deployed to measure a delay associated with a vehicle traversing to a location of interest on the traffic network, such as a roadway intersection. For example, a particular sensor may identify signal strength information (e.g., a received signal strength indication (RSSI) value, etc.) for each of a plurality of received signals for a given device associated with a vehicle traveling on the traffic network. The identified signal strength information may be used to create a signal strength profile for use in determining the travel time delay of the vehicle in relation to the location of interest. In this regard, the signal strength profile may depict the signal strength value for each of the plurality of received signals such that one or more algorithms may be used to selectively identify particular received signals (based on the signals strength values, or derivatives thereof) for generating traffic information, including intersection delay. Accordingly, the travel delay of a vehicle traversing an intersection may be determined in part by identifying and processing the signal strength information associated with each of the received signals of a device associated with a vehicle as it approaches and departs the intersection.

Figure 7A:
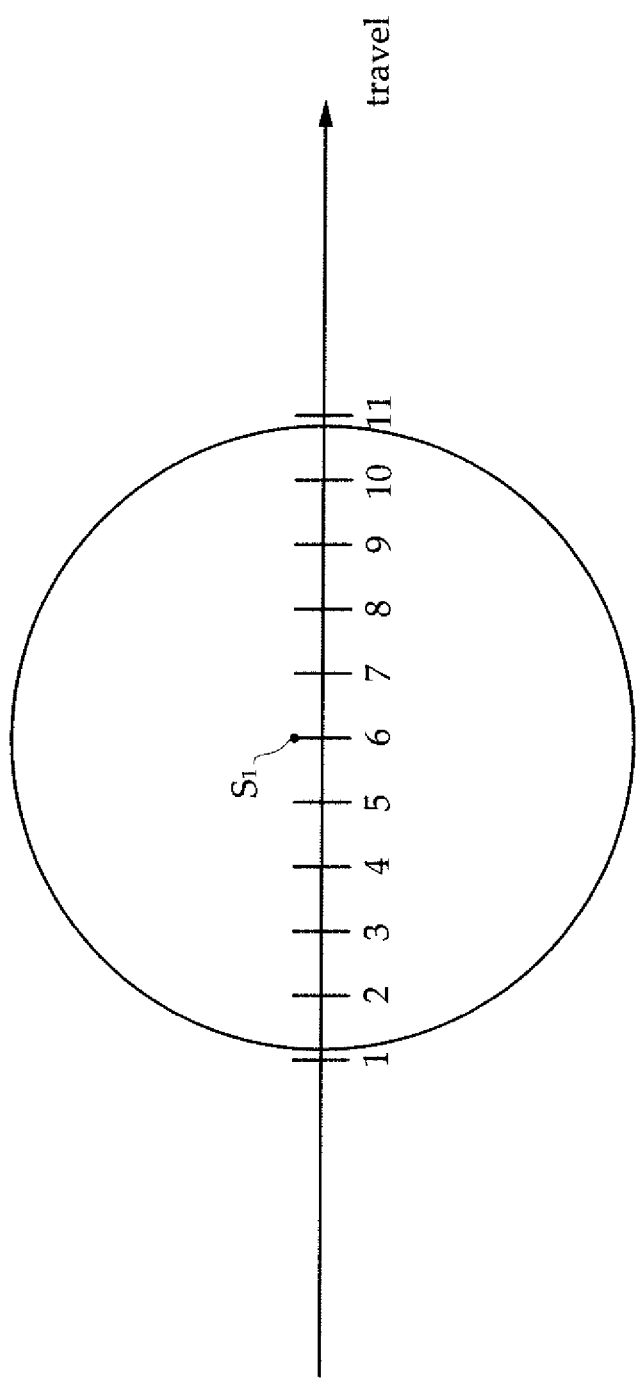
FIGS. 7a-7b illustrates an embodiment of various algorithm inputs that may be used to calculate travel parameters in accordance with the present invention.
Figure 7B:
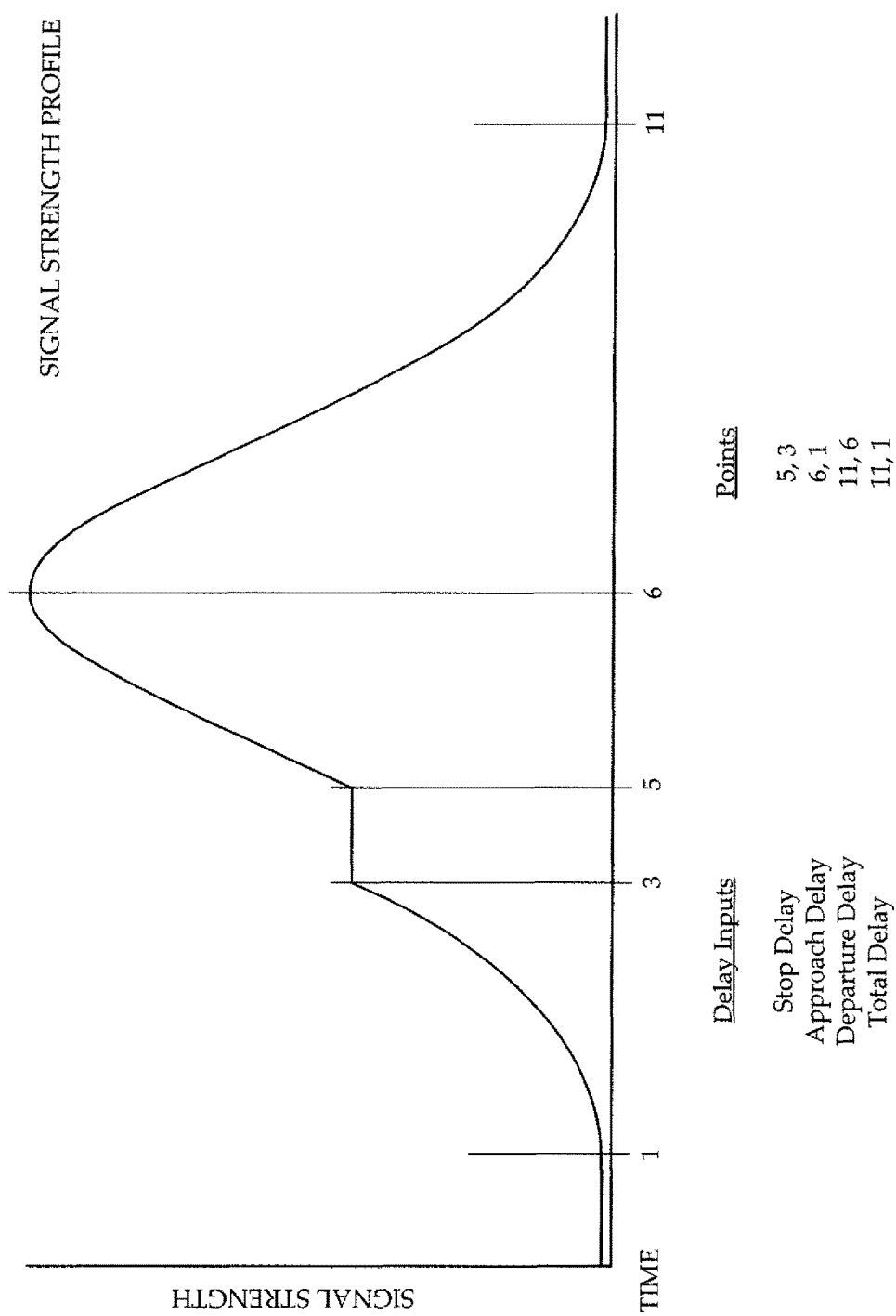

By way of further illustration, FIGS. 7a-7b depict a variety of algorithm inputs that may be used to create the signal strength profile and determine an intersection delay or, more generally, any travel time delay associated with traversing a location of interest within the roadway network. For example, FIG. 7a depicts, with a circle, the transmission range of a device that is sequentially disposed adjacent to sensor S1. In this regard, sensor S1 may first receive signals from the device when the device is disposed approximately at point 1 and may last receive signals from the device when the device is disposed approximately at point 11. The sensor S1 may therefore receive a signal from a given device at each of points 1-11 as the vehicle associated with the device travels in relation to the sensor S1 (e.g., travels across an intersection). Each of the received signals may be collected and analyzed for use in various algorithms for determining the traffic information. Further, each received signal from the device may include signal strength information, for example, indicative of an RSSI value of the received signal in relation to the sensor S1.

A signal strength profile may be generated for the device associated with the vehicle as it traverses the location of interest by at least partial reference to the signal strength information of the received signal, as further understood by reference to FIG. 7b. In this regard, FIG. 7b depicts the signal strength profile that includes the identified signal strength information collected for each of the received signals from the device as detected at sensor S1 over a period of time associated with travel across an intersection (i.e., signals within the transmission range shown in FIG. 7a). In particular, the horizontal axis depicts travel time in arbitrary units whereas the vertical axis depicts signal strength again in arbitrary units.

Accordingly, the received signal strength information, and derivatives thereof (as shown in the signal strength profile), may therefore be used to determine one or metrics associated with the travel time of a vehicle as it traverses the location of interest on the traffic network with which the sensor S1 is associated. For example, a variety of different algorithms may be used, alone or in combination, to account for the travel time of a vehicle while it remains in communication with the sensor S1 based at least in part on the generated signal strength profile. In this regard, the transit time of the associated vehicle may be determined between the location of the vehicle at a first instance of a received signal and the location of the vehicle at a second instance of a received signal, which may correspond to a travel delay of interest. In the illustrated example, a stop delay algorithm may use points 5 and 3. An approach delay algorithm may use points 6 and 1. A departure delay algorithm may use points 11 and 6. And a total delay algorithm may use points 11 and 1. As such, any of the foregoing algorithms may select at least two points (instances of a received signal) for comparison to determine a traffic delay of interest associated with the intersection.

For example, the stop delay algorithm may be used to determine the time that a vehicle is stopped at an intersection (e.g., stopped for a traffic signal). In this regard, points 5 and 3 may represent a period during which the signal strength value of the received signal remains substantially constant for a period of time (indicating that the device remained stationary in relation to the sensor S1 during the time period). Points 5 and 3 may therefore be identified in relation to a derivative of the signal strength information, for example, an identification of a last instance where at the signal strength rate of change equals zero (point 5) and an identification of a first instance where at the signal strength rate of change equals zero (point 3). It will be appreciated that other criteria may be employed for identifying the period during which the vehicle is stopped at an intersection, including a comparison of signal strength values among sequentially received signals to determine that the vehicle remained motionless for a period of time.

The approach delay algorithm may be used to determine the total travel time of a vehicle as it approaches the intersection, including any intervening delays (such as stop delays) during the approach to the intersection. In this regard, points 6 and 1 may represent a period during which a vehicle approaches the intersection. In particular, points 6 and 1 may be identified in relation to the value of a received signal strength at the respective points, for example, a time whereat the received signal from the device is associated with a maximum signal strength value (point 6) and an identification of a time of the first instance of sensor S1 receiving a signal from a device associated with the vehicle (point 1).

The departure delay algorithm may be used to determine the total travel time of a vehicle as it departs the intersection. In this regard, points 11 and 6 may represent a period during which a vehicle departs the intersection. In particular, points 11 and 6 may be identified in relation to the value of a received signal strength at the respective points, for example, an identification of a time of the last instance of the sensor S1 receiving a signal from a device associated with the vehicle (point 11) and a time whereat the received signal from the device is associated with a maximum signal strength value (point 6).

The total delay algorithm may be used to determine the total travel time of a vehicle as it traverses the intersection. In this regard, points 11 and 1 may represent a period during which the vehicle traverses the intersection (and is within the detectable transmission range of sensor S1, as depicted in FIG. 7*a*). In particular, points 11 and 1 may be identified in relation to the value of a received signal strength at the respective points, for example, an identification of a time of the last instance of the sensor S1 receiving a signal from a device associated with the vehicle (point 11) and a time of the first instance of the sensor D1 receiving a signal from a device associated the with vehicle (point 1).

It will be appreciated that the foregoing described algorithms are presented for purposes of illustration and are not intended to limit the scope of embodiments described herein. Other algorithms may be implemented in relation to determining various travel delays of a vehicle in relation to a location of interest within the traffic network, including selectively identifying points of the signal strength profile for determining traffic information based on identification information, signal strength information, or other predetermined and/or user-defined parameters for use in determining the traffic information, including the travel time delay associated with a vehicle traversing an intersection.

Figure 8:
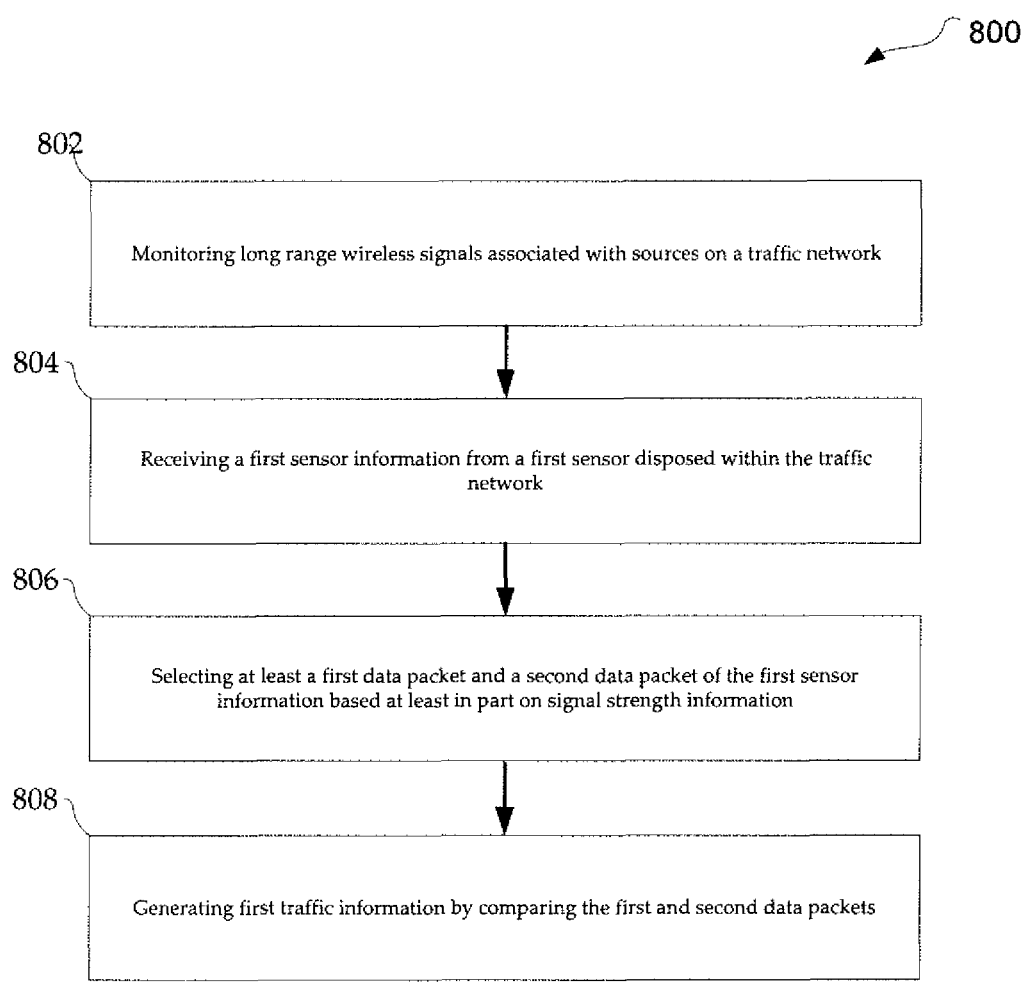
FIG. 8 is a flow chart illustrating an embodiment of a process implemented by components of the system of FIG. 4.

Turning next to FIG. 8, a flowchart illustrating a process 800 is depicted that may be implemented by a sensor in accordance with the present invention. For example, process 800 may facilitate the foregoing determination of traffic information (delay) associated with a vehicle as it traverses an intersection. The process 800 is initiated by monitoring (802) a long-range wireless signal associated with sources on a traffic network. The long-range wireless signals may include packetized data communications that include a stream of data packets. Notably, each data packet of the stream of data packets may include signal strength information (e.g., an RSSI value in relation to the particular sensor within the traffic network). As outlined in detail above, the sensors of the traffic network may forward raw signal information to a remote platform or conduct some preprocessing. In this regard, process 800 continues by receiving (804) first sensor information from a first sensor disposed within the traffic network. The first sensor information may be associated with a first source (e.g., a vehicle traveling within the roadway network) based on the packetized data communications.

The process 800 may continue by selecting (806) at least a first data packet and a second data packet of the first sensor information based at least in part on the signal strength information of each respective packet. In this regard, the first data packet and the second data packet may be selectively identified and distinguished from the plurality of received data packets associated with the first source based on the signal strength information. For example, one or more algorithms corresponding to a travel time delay of interest (e.g., a stop delay, an approach delay, a departure delay, a total delay, etc.) may be implemented to selectively identify the first and the second data packets for use in determining traffic information. In this regard, the process 800 may continue by generating (808) first traffic information by comparing the first and the second data packets. For example, the time of identification of the second data packet may be compared with respect to the time of identification of the first data packet to calculate a travel time of a vehicle between the receipt of the first and the second data packets, which may correspond to a particular travel time delay (e.g., in relation to a vehicle traversing the intersection).

The foregoing description of the present invention has been presented for purposes of illustration and description. Furthermore, the description is not intended to limit the invention to the forms disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for use in monitoring traffic on a traffic network, said traffic network including a plurality of geographically distributed sensors, the method comprising:

monitoring wireless communications associated with sources on said traffic network, said wireless communications comprising a stream of data packets wherein each packet of the stream of data packets includes identification information for identifying a source of each respective packet;

operating a first sensor and second sensor of said geographically distributed sensors to provide, to a processor system, first and second sensor information, respectively, associated with a first source based on said monitored wireless communications, each of said first and second sensor information including a series of data packets including one or more non-maximum packets having a signal strength less than that of at least one other packet of said series of packets;

receiving said first sensor information and said second sensor information at said processor system; and processing at said processor system said first sensor information and said second sensor information so as to identify at least a first series of data packets from said first sensor and a second series of data packets from said second sensor, said first series of data packets from said first sensor and said second series of data packets from said second sensor associated with the first source, to obtain a first value for said first sensor and second value for said second sensor, at least one of said first and second values being obtained using at least one non-maximum packet, and to generate first traffic information based at least in part on comparison of said first and second values.

2. The method of claim 1, wherein said wireless communications comprise long range wireless signals.

3. The method of claim 2, wherein long range wireless signals comprise data transmissions on the 2.4 GHz, 5.8 GHz, or 5.9 GHz spectrum.

4. The method of claim 1, wherein said identifying comprises filtering said wireless communications to include only probe requests.

5. The method of claim 4, wherein said first sensor information and said second sensor information include a time of identification of each packet of said identified first and second series of packets associated with said first source.

6. The method of claim 5, wherein said first sensor information and said second sensor information include a MAC address associated with each packet of said identified first and second series of packets associated with said first source.

7. The method of claim 6, wherein said first and said second sensor information includes a RSSI value of each packet of said identified first and second series of packets associated with said first source.

8. The method of claim 7, wherein said first traffic information includes a position of said first source.

9. The method of claim 7, wherein said first traffic information includes a travel time of said first source between said first sensor and said second sensor.

10. The method of claim 9, further comprising aggregating said travel time of said first source with a travel time of a second source to generate a characteristic.

11. The method of claim 10, wherein the characteristic is an average travel time of the first and second sources.

12. The method of claim 10, wherein the characteristic is an average speed of the first and second sources.

13. The method of claim 10, wherein the characteristic is used to graphically plot a speed as a function of highway position.

14. The method of claim 9, wherein said travel time is based on a first of said time of identification of said MAC address by said first sensor and a first of said time of identification of said MAC address by said second sensor.

15. The method of claim 9, wherein said travel time is based on a last of said time of identification of said MAC address by said first sensor and a last of said time of identification of said MAC address by said second sensor.

16. The method of claim 9, wherein said travel time is based on a first of said time of identification of said MAC address by said first sensor and a last of said time of identification of said MAC address by said second sensor.

17. The method of claim 9, wherein said travel time is based on a last of said time of identification of said MAC address by said first sensor and a first of said time of identification of said MAC address by said second sensor.

18. The method of claim 9, wherein said travel time is based on said time of identification of said MAC address by said first sensor associated with a maximum value of said RSSI and said time of identification of said MAC address by said second sensor associated with a maximum value of said RSSI.

19. The method of claim 9, wherein said travel time is based on a rate of change of said RSSI value at said first sensor or said second sensor.

20. The method of claim 1, wherein said identifying comprises filtering said wireless communications based on changes in signal strength.

21. The method of claim 1, wherein said identifying comprises filtering said wireless communications based on a list of MAC addresses received from an upstream sensor.

22. The method of claim 1, further comprising:
transmitting said first traffic information over a dedicated short range communications network associated with said geographically distributed sensors.

23. The method of claim 1, further comprising:
generating a report comprising of said first traffic information.

24. The method of claim 23, further comprising:
querying said report for said first traffic information associated with a transit event or an area of interest.

25. The method of claim 1, further comprising:
adjusting traffic control devices associated with said roadway network on the basis of said first traffic information.

26. An apparatus for use in a system of monitoring vehicle traffic on a roadway network comprising:
a plurality of geographically distributed sensors within one or more roadway networks, wherein each sensor of the plurality of geographically distributed sensors is configured to detect the presence of wireless signals within the roadway network, each sensor comprising:
a local processing engine, executable by a processor of each sensor, that is configured to monitor wireless communications associated with vehicles on said roadway network; and
a client, executable by said processor of each sensor; and
a central processing server communicatively interconnected to said plurality of geographically distributed sensors, the central processing server comprising:
a sensor information engine, executable by a processor of said central processing server, that is configured to identify at least first and second sensor information from first and second sensors of said plurality of geographically distributed sensors, each of said first and second sensor information being associated with a first source and including a series of data packets including one or more non-maximum packets having a signal strength less than that of at least one other packet of said series of packets;
a traffic analysis engine, executable by said processor of said central processing server, that is configured to calculate a travel time of said first source between said first sensor and said second sensor by obtaining a first value for said first sensor and a second value for said second sensor, at least one of said first and second values being obtained using at least one non-maximum packet; and a first database, accessible by said processor of said central processing server, that is configured to store said first and second sensor information associated with said first source;

wherein said client is operable to transmit said monitored wireless communications to said central processing server.

27. The apparatus of claim 26, wherein said local processing engine is configured to identify at least a first data packet associated with said first source.

28. The apparatus of claim 27, wherein said local processing engine is configured to calculate a speed of said first source.

29. The apparatus of claim 26, wherein each sensor is associated with a unique geographical identifier.

30. The apparatus of claim 26, wherein said plurality of sensors is distributed throughout a roadway intersection.

31. The apparatus of claim 30, wherein said traffic analysis engine is configured to calculate a travel time delay through and across said roadway intersection.

32. The apparatus of claim 26, wherein said local processing engine is configured to count identified wireless communications associated with distinct sources.

33. The apparatus of claim 26, wherein said at least first and second sensor information is configured to identify wireless communications associated only with probe requests associated with long range wireless signals.

34. The apparatus of claim 26, wherein said first database is configured to store information specifying a time of identification of each packet of said series of data packets associated with said first source.

35. The apparatus of claim 26, wherein said first database is configured to store information specifying a MAC address of each packet of said series of data packets associated with said first source.

36. The apparatus of claim 26, wherein said first database is configured to store information specifying a RSSI value of each packet of said series of data packets associated with said first source.

* * * * *